United States Patent [19]

Harima et al.

[11] Patent Number: 5,198,737
[45] Date of Patent: Mar. 30, 1993

[54] PROGRAMMABLE CONTROLLER FOR INDUSTRIAL ROBOTS

[75] Inventors: Taro Harima; Meiko Wakamiya, both of Amagasaki; Yoshitika Takizawa; Shyunji Mori, both of Nagoya, all of Japan

[73] Assignee: Mitsubishi Denki Kabushiki Kaisha, Tokyo, Japan

[21] Appl. No.: 600,366

[22] Filed: Oct. 19, 1990

[30] Foreign Application Priority Data

Oct. 23, 1989 [JP] Japan .................... 1-275178

[51] Int. Cl.$^5$ ............................. G06F 15/46
[52] U.S. Cl. ................ 318/568.11; 901/6; 901/8; 395/82
[58] Field of Search .......... 318/568.1, 568.11, 568.24, 318/568.23, 568.15, 567; 364/513, 130, 138, 191–192; 901/6–8

[56] References Cited

U.S. PATENT DOCUMENTS

| | | | |
|---|---|---|---|
| 4,730,258 | 3/1988 | Takeda et al. | 364/513 |
| 4,864,205 | 9/1989 | Fisher et al. | 318/568.11 |
| 4,864,206 | 9/1989 | Onaga et al. | 318/568.11 |
| 4,868,472 | 9/1989 | Daggett | 364/513 |
| 4,912,650 | 3/1990 | Tanaka et al. | 364/513 |
| 4,951,225 | 7/1990 | Lee et al. | 364/513 |
| 4,956,790 | 7/1990 | Tsuchihashi et al. | 364/513 |
| 4,962,338 | 10/1990 | Daggett et al. | 318/568.11 |

OTHER PUBLICATIONS

BFP-A5188-*, Mitsubishi, Melfa-Pickarm, 33 pages, undated.

Primary Examiner—William M. Shoop, Jr.
Assistant Examiner—David Martin
Attorney, Agent, or Firm—Rothwell, Figg, Ernst & Kurz

[57] ABSTRACT

A programmable controller 1, capable of programming the whole operations of the factory cell 3 including a robot, is provided with a program input device 11 and comprises: a memory for storing the program, a discrimination means 13 for discriminating the blocks within the program which define the movements of the robot; an information generation circuit 14 for generating information relative to the movement of the robot, which is transmitted to the robot controller 2 via a communication means 16a; and an instruction processing circuit 15 which executes via the contact input and output circuits 17 and 18 the instructions other than those of the robot defining blocks, relative to the states of contacts and relays of the factory cell 3, in parallel with the movements of the robot controlled by the robot controller 2.

3 Claims, 7 Drawing Sheets

PROGRAMMABLE CONTROLLER FOR INDUSTRIAL ROBOTS

BACKGROUND OF THE INVENTION

This invention relates to programmable controllers for industrial robots, and more particularly to programmable controllers for factory cells including one or more robots for assembling, for example, the parts of automotive vehicles.

Figure 1:
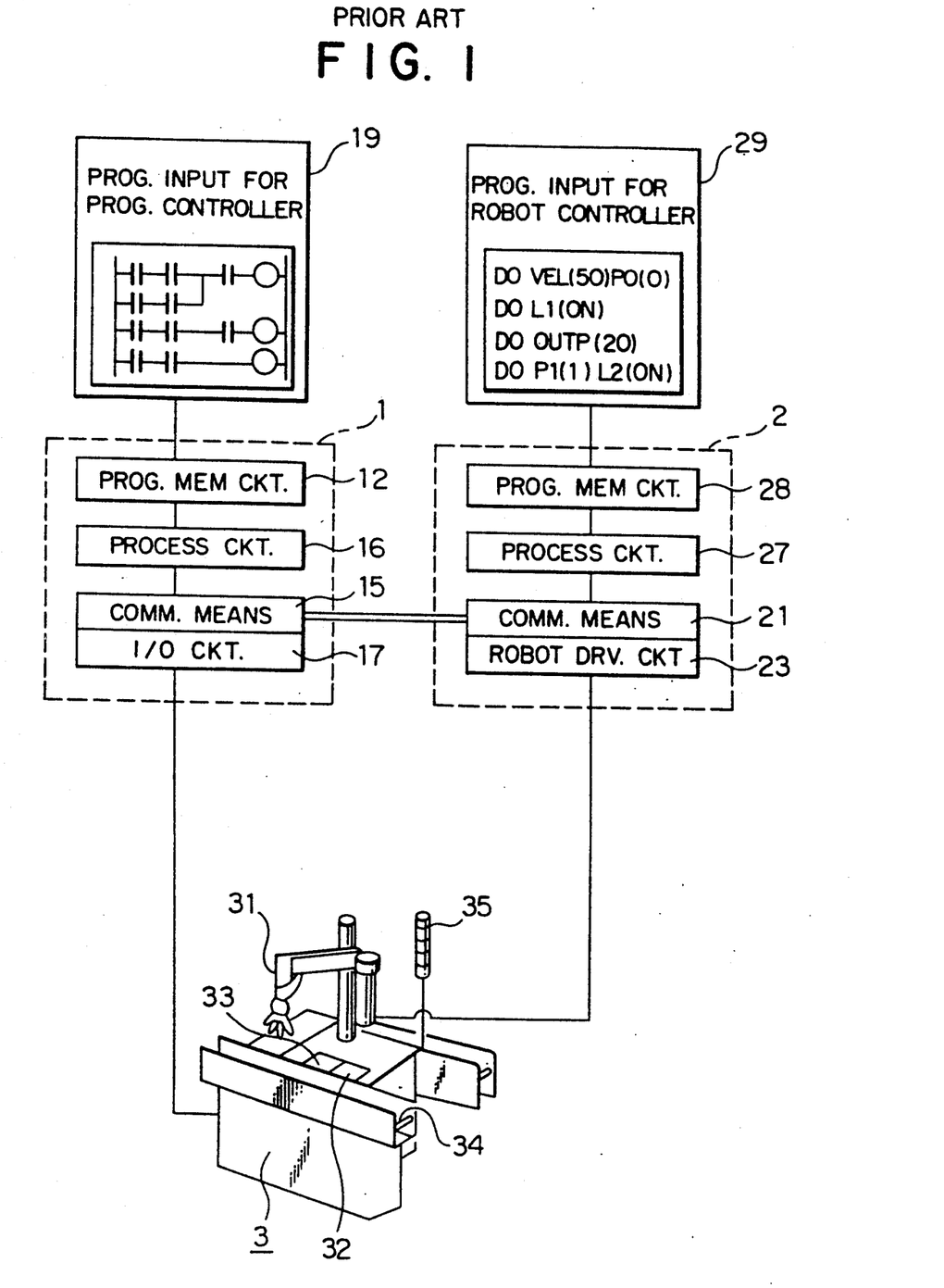
FIG. 1 shows schematically a factory cell including a robot which is provided with a conventional programmable controller.

FIG. 1 shows schematically a factory cell consisting of an industrial robot (commercially available from Mitsubishi Electric Corporation under a trade name MELFA-PICKARM) and the robot controller, provided with a conventional programmable controller, generally referred to as a sequencer (commercially availabe from Mitsubishi Electric Corporation under the trade name MELSEC). The system shown in FIG. 1 comprises: a factory cell 3 including a robot (at the bottom of the figure), a robot controller 2 (top right), and a programmable controller 1 (top left).

The programmable controller or sequencer 1 is provided with a program input device 19 via which a program (written, for example, in a ladder language, as described below) is inputted for sequencing the operations of the whole factory cell. The box within the block 19 shows an example of the display screen of the console of the input device 19. Further, a memory circuit 12 stores the program inputted via the input device 19. A processing circuit 16 interprets the program stored in the memory 12. Further, an input/output circuit 17 executes input/output operations on the basis of the interpretations of the program effected by the processing circuit 16, wherein a communication means 15 performs communications with the robot controller 2. The programmable controller (sequencer) comprises the circuits and means 12, 16, 15, and 17 as described above.

On the other hand, the robot controller 2 is provided with a program input device 29 via which a program (written, for example, in a robot language as described below) describing the operations of the robot in a sequential order is inputted. The box within the block 29 shows an example of the inputted program displayed on the screen of the input device 29. A program memory circuit 28 stores the program inputted via the input device 29. A processing circuit 27 interprets the program stored in the memory 28. Further, a driving circuit 23 drives the robot on the basis of the interpretations of the program effected by the processing circuit 27, wherein a communication means 21 communicates with the programmable controller 1. The robot controller comprises circuits and means 28, 27, 21, and 23 as described above.

The factory cell 3, on the other hand, comprises a robot arm 31, a fixing device 32 for fixing the work (object), a sensor 33 for detecting the object, a conveyer 34, and operation indicator lamps 35.

In the case of a typical conventional device, communication between the factory cell 3 (provided with the robot controller 2), and the programmable controller 1 was realized by individually connecting the general purpose input/output terminals of the robot and the controller. In the case of the device of FIG. 1, such complicated wiring can largely be dispensed with. Namely, a single communication cable or bus (referred to as a sequencer link) connects the communication means 15 of the programmable controller 1 to communication means 21 of the robot controller 2 such that the system input/output and the general purpose input/output signals of the robot controller 2 are allotted and coupled to the exclusive input/output terminals of the programmable controller 1 according to a correspondence table.

Figure 6:
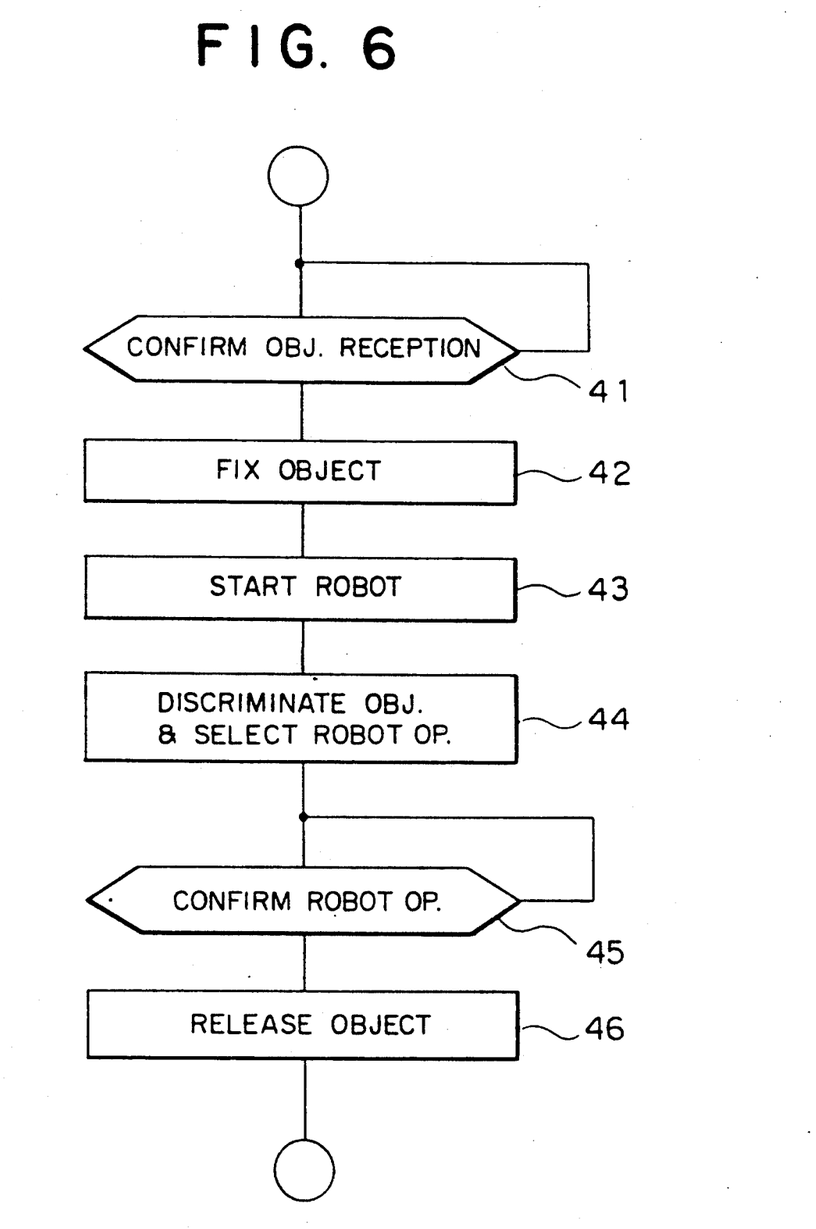
FIG. 6 is a flowchart showing a typical sequence of operations of the robot of a factory cell.

A typical sequence of operations of the robot is shown in FIG. 6. First, at step 41, the reception of the object (work) is confirmed. Next, at step 42, the object is fixed, and at step 43, the robot is started. Further, at step 44, the kind of object is discriminated, and the operation of the robot is selected accordingly. At step 45, the completion of the operation of the robot is waited for and confirmed, and finally, at step 46, the object is released.

Figure 2:
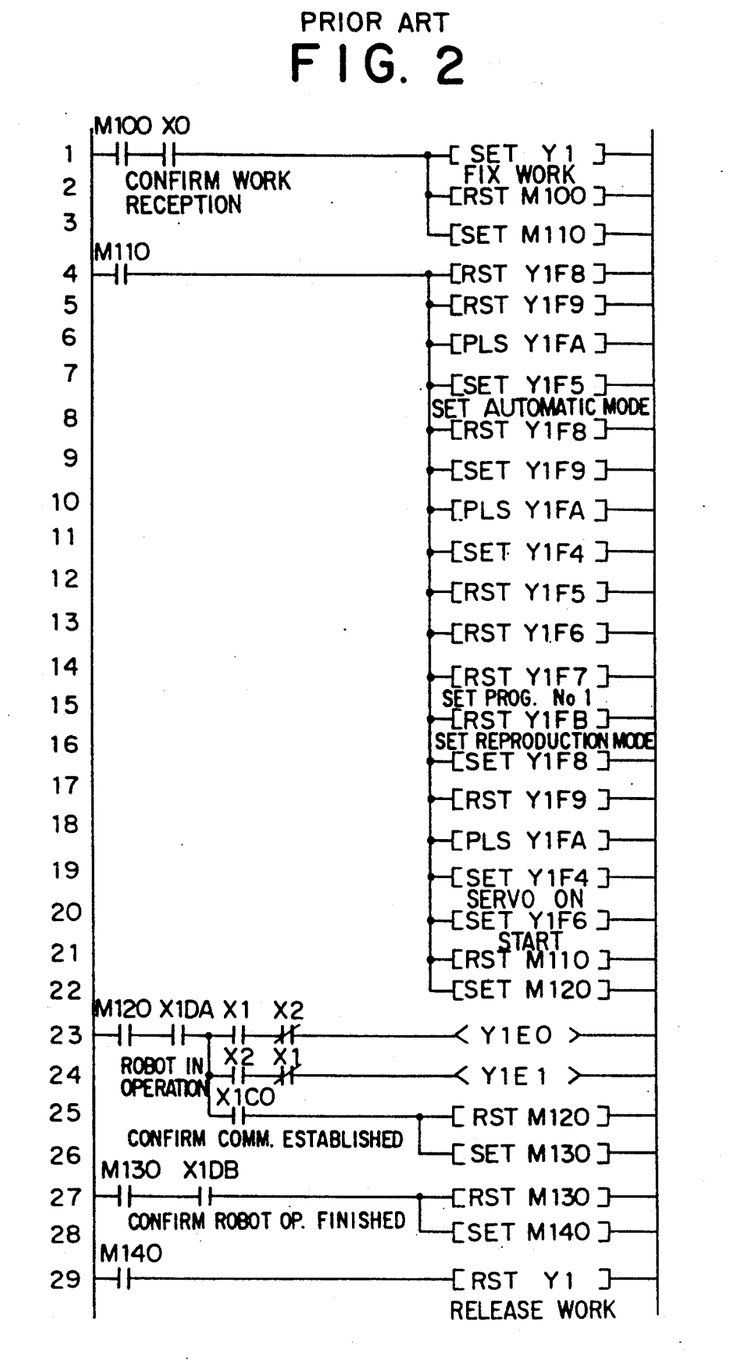
FIGS. 2 and 3 show exemplary programs inputted to the programmable controller and the robot controller of FIG. 1, respectively.
Figure 3:
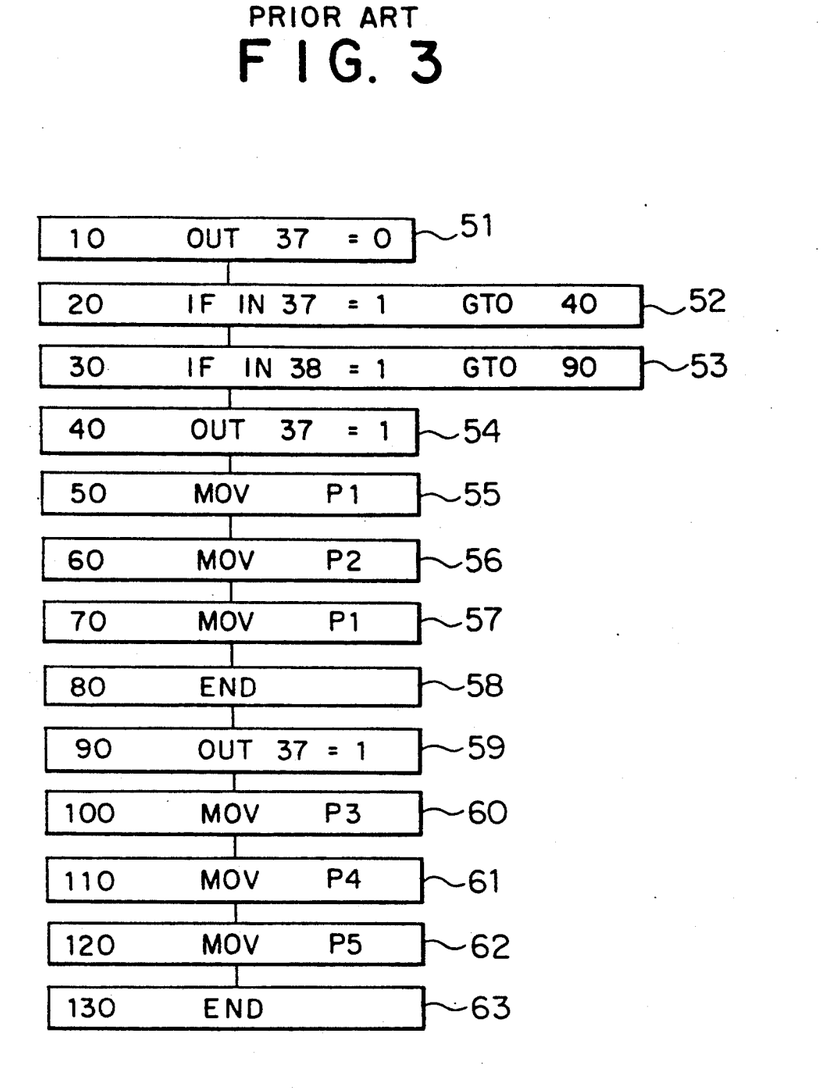

The series of operations of the factory cell 3 must be described by the ladder language as shown in FIG. 2 with respect to the programmable controller 1, and, further, by a robot language as shown in FIG. 3 with respect to the robot controller 2.

FIG. 2 shows an example of the program of the programmable controller 1, where the numerals at the left are the line numbers, and the words between the lines are the comments on the program.

Lines 1 through 3 of FIG. 2 correspond to the steps 41 and 42 in FIG. 6, where the reception of the object is confirmed and the object is fixed. The relay Y1 starts the cylinder of the fixing device 32 for fixing the object. Further, lines 4 through 22 correspond to step 43 of FIG. 6 where the robot is started. The correspondence or allotment between the ports (or contacts) of the communication means of the programmable controller 1 and those of the robot (including the robot controller 2) are effected in accordance with a correspondence table. (For example, the output port or contact Y1F5 of the programmable controller 1 which is set at line 7 of FIG. 2 corresponds to the automatic mode selection input of the robot controller 2.) Further, at lines 23 through 26 corresponding to step 44 of FIG. 6, the kind of the object is discriminated on basis of the states of the input ports or contacts X1 and X2 of the programmable controller 1, and the result of the discrimination is communicated to the robot controller 2 via the output port or contact Y1E0 of the programmable controller 1 (corresponding to the input port IN 37 of the robot controller 2 in accordance with the correspondence table) and via the output port or contact Y1E1 of the programmable controller 1 (corresponding to the input port IN 38 of the robot controller 2 in accordance with the correspondance table). The establishment of the communication is confirmed via the input port X1CO of the controller 1 (corresponding to the output port OUT 37 of the robot controller 2). Further, at lines 27 through 28, the completion of the operation of the robot is waited and confirmed (step 45 in FIG. 6), and at line 29, the object is released (step 46 in FIG. 6).

FIG. 3 shows the program inputted to the robot controller 2, which corresponds to the above ladder language program of the programmable controller 1. The program describes the sequential order of operations in steps 51 through 63.

First, at step 51 in FIG. 3, the output port or contact OUT 37 of the robot controller 2 for confirming the establishment of the communication is initialized to 0. At the subsequent steps 52 and 53, a communication with the programmable controller 1 is effected so as to select the kind of operation of the robot in accordance with the kind of the object (work). The input ports or contacts IN 37 and IN 38 of the robot controller 2 correspond, and hence are coupled, to the output ports Y1E0 and Y1E1 of the programmable controller 1, respectively. If the input port IN 37 is on (IN 37=1) at step 52, then the series of operations at steps 54 through 58 are selected, and the execution proceeds to step 54, where the output port or contact OUT 37 (corresponding to the input port X1C0) of the programmable controller 1) is turned on (OUT 37=1) so as to notify the establishment of the communication to the programmable controller 1. Thereafter, at the subsequent steps 55 through 57, the robot arm operations are effected as indicated thereat, to end the routine at step 58. When the END command is effected at step 58, a signal is transmitted to the input port X1D8 of the programmable controller 1, to notify the programmable controller of the completion of the operation of the robot. When, on the other hand, the input port IN 38 is on (IN 38=1) at step 53, the execution proceeds to step 59, and operations similar to the above are effected at the subsequent steps 60 through 63.

The above device of FIG. 1, however, has the following disadvantages.

First, since the programming is divided into two parts, the programming of the operations of the robot as a whole is difficult. The programming of the programmable controller is done in a ladder language capable of describing the parallel operations, while that of the robot controller is done in the robot language describing sequential operations. The programming as a whole must be done in two different languages and hence is complicated and time-consuming. The operations of the robot are not explicit upon the face of the program of the programmable controller, which controls the whole operations of the factory cell. On the other hand, it is difficult to have a clear view of the operations of the whole factory cell from the program of the robot controller. Unless the correspondence table of the input/output ports or contacts of the controller and the robot controller are referred to, the correspondence or connections of these ports or contacts cannot be known. Thus, the efficiency of writing or maintaining the program is low.

A further disadvantage is that the execution of the program is time-consuming since the frequent reciprocal communications between the two controllers 1 and 2 take time. Namely, during the execution of the program, the synchronization and the communication between the programmable and the robot controllers require frequent operations of the I/O ports or contacts of the two controllers based on the correspondence table.

SUMMARY OF THE INVENTION

It is therefore an object of this invention to provide a programmable controller by means of which the operations of factory cells including robots can be described by means of a single language, such that the complicated programming process requiring two distinct languages for the programmable controller and the robot controller can be dispensed with.

Further object of this invention is to provide such a programmable controller by which the operation synchronization and communication between the programmable and the robot controllers are simple and high-speed.

The above objects are accomplished in accordance with the principle of this invention by a programmable controller for a factory cell which comprises: a program input means via which a program describing a series of operations of said robot is inputted, wherein the program comprises: robot operation defining instructions defining operations of the robot, and instructions other than the robot operation defining instructions; a memory means, connected to said program input means, for storing the program inputted via the program input means; a discrimination means, coupled to said memory means, for discriminating the robot operation defining instructions from the other instructions of the program stored and read out from the memory means; an information generation means, coupled to the discrimination means, for generating robot operation information in accordance with the robot operation defining instructions discriminated by said discrimination means; a first communication means, coupled to said information generation means, for transmitting to said robot controller of the robot the robot operation information generated by the information generation means; a second communication means, coupled to the robot controller, for receiving information relative to a state (i.e., status) of the robot operation from the robot controller; and an instruction execution means, coupled to said discrimination means and said second communication means, for executing the instructions other than the robot operation defining instructions in synchrony with the operation state (status) information transmitted from the robot controller via the second communication means.

Preferably, the factory cell comprises a plurality of contacts and relays, and said instructions other than the robot operation defining instructions define states (statuses) of the contacts and relays of the factory cell with respect to each other. Further, it is preferred that the robot operation defining instructions comprise blocks each describing a unitary movement of the robot.

BRIEF DESCRIPTION OF THE DRAWINGS

The novel features which are believed to be characteristic of this invention are set forth with particularity in the appended claims. This invention itself, however, both as to its organization and method of operation, with further objects and advantages thereof, may best be understood from the following detailed description of the preferred embodiments taken in connection with the accompanying drawings, in which:

In the drawings, like reference numerals represent like or corresponding parts.

DETAILED DESCRIPTION OF THE PREFERRED EMBODIMENTS

Figure 4:
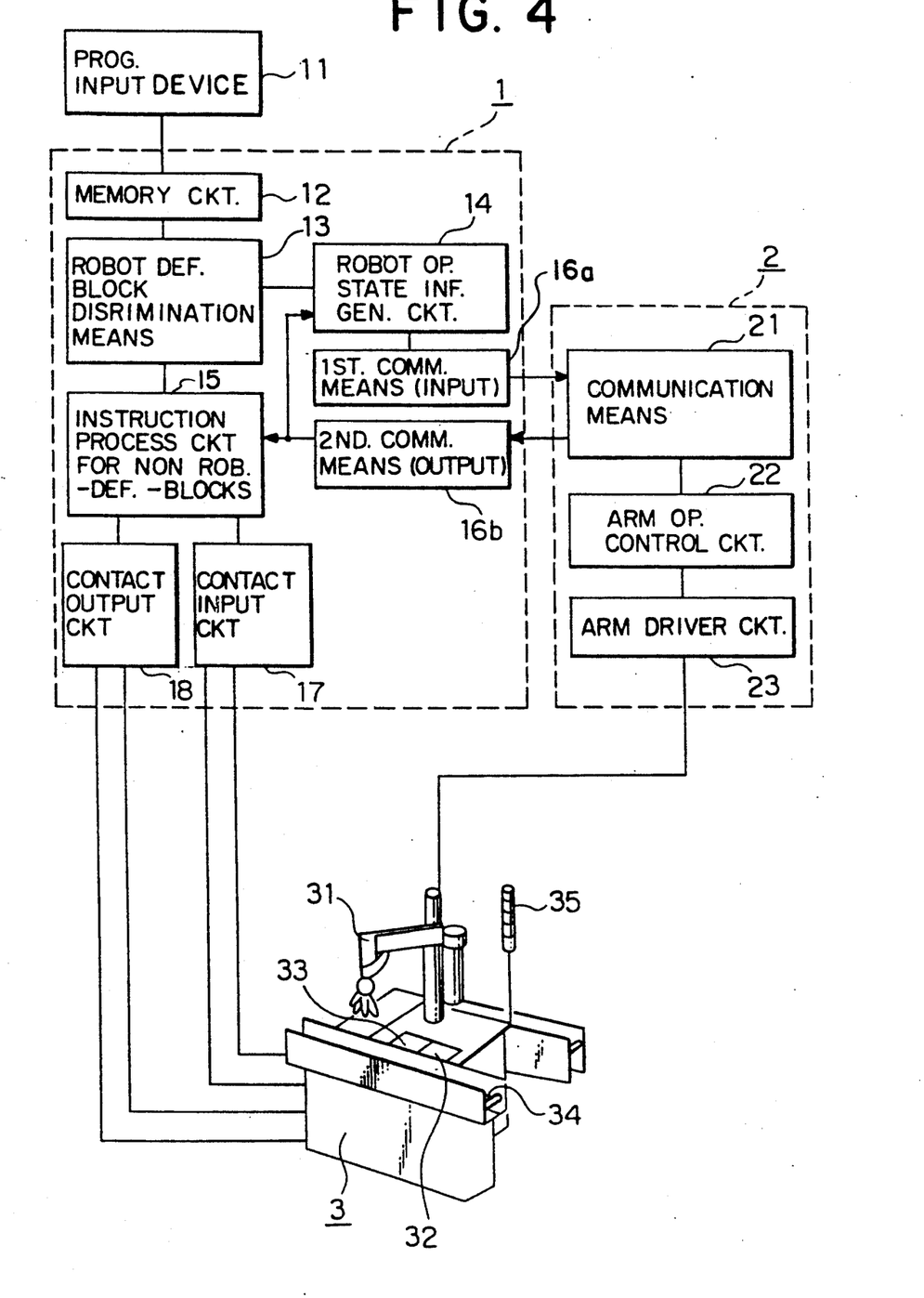
FIG. 4 is a view similar to that of FIG. 1, but shows a factory cell provided with a programmable controller according to this invention.
Figure 5:
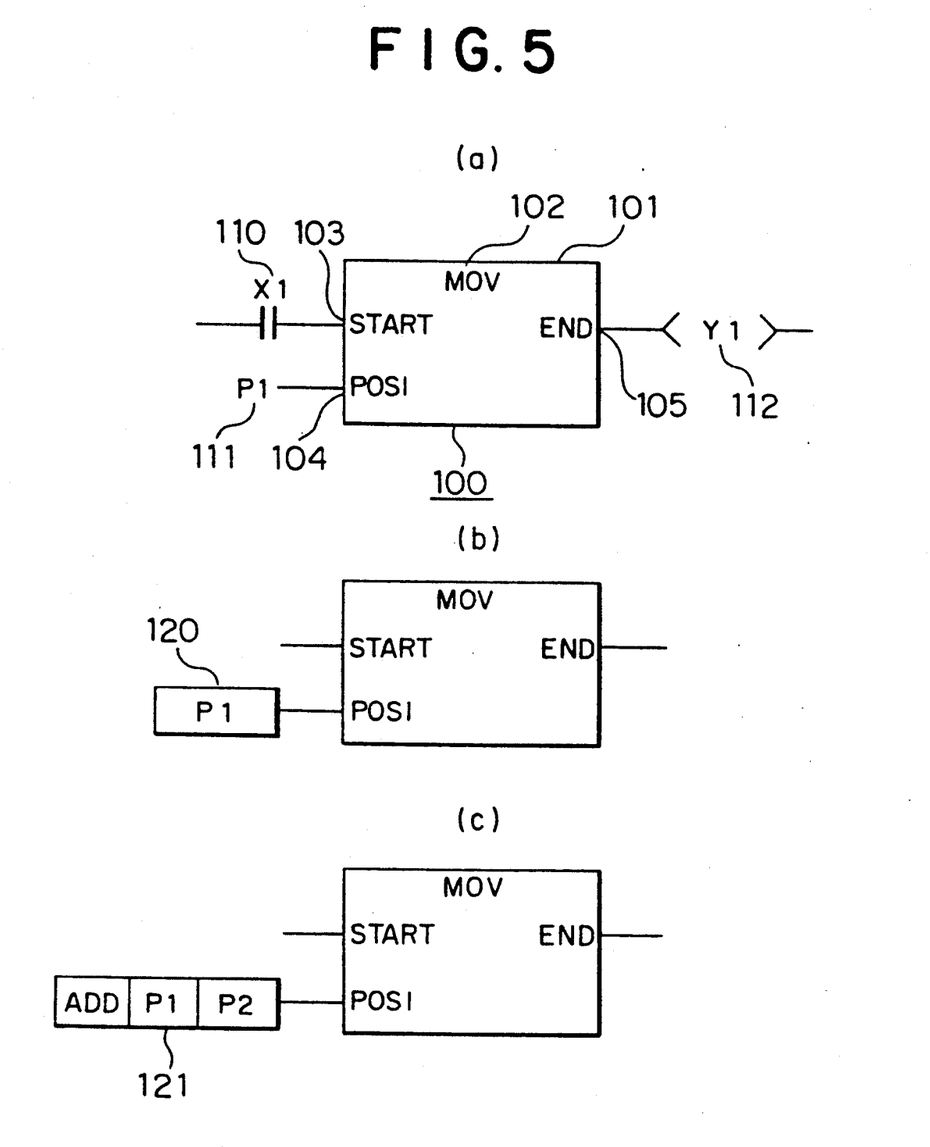
FIG. 5 shows examples of robot operation defining blocks utilized in the program of the programmable controller of FIG. 4.

Referring now to FIGS. 4 and 5 of the drawings, an embodiment of this invention is described. FIG. 4 shows schematically the organization of the factory cell provided with a programmable controller according to the embodiment of this invention. FIG. 5 (a), (b), and (c) show the robot defining blocks according to the embodiment.

As shown in FIG. 4, the programmable controller 1 is provided with a program input device 11 via which the program is inputted thereto. The program inputted via the input device 11 comprises, as described in detail hereinbelow, the robot defining blocks defining the operations of the robot, and other program portions written in a conventional programming language of the programmable controller. The program inputted via the input device 11 is stored in the memory circuit or device 12. A robot defining block discrimination means 13 discriminates the robot defining blocks from other portions of the program which is read out from the memory 12. A robot operation state information generation circuit 14 generates robot operation information from the robot defining blocks discriminated and extracted from the program by means of the robot defining block discriminating means 13. An instruction processing circuit 15 interprets the instructions of the non-robot-defining blocks (the portions of the program other than the robot defining blocks) which define the input/output conditions by means of a conventional language of the programmable controller. A first communication means 16a receives the robot operation information from the information generation circuit 14, and transmits it to the robot controller 2. A second communication means 16b receives the robot operation state from the robot controller 2 and transmits it to the robot operation state information generation circuits 14 and the instruction processing circuit 15 for processing and interpreting the non-robot-defining blocks. A contact input circuit 17 effects the contact inputs to the factory cell 3, based on the results of the processings of the instruction processing circuit 15. On the other hand, the contact output circuit 18 receives the contact outputs from the factory cell 3. The programmable controller 1 comprises the above circuits and means 12 through 18.

The robot controller 2 comprises a communication means 21 which receives the robot operation information from the robot operation information generation circuit 14, and transmits the operational state of the robot arm 31 to the programmable controller 1. An arm operation control circuit 22 controls the operations of the robot arm 31 on the basis of the robot operation information generated by the programmable controller 1. An arm driver circuit 23 drives the robot arm 31 in response to the instruction of the arm operation control circuit 22. The robot controller comprises the above circuits and means 21 through 23.

The factory cell 3 comprises: a robot arm 31 controlled by the robot controller 2; a fixing device 32 for fixing the object (work), controlled by means of the port or contact input circuit 17 and the port or contact output circuit 18; a sensor 33 for detecting the object; a conveyer 34; and operation indicator lamps 35. The pieces of information with respect to the contacts and relays of the factory cell 3 are received from and transmitted to the programmable controller 1 via the contact input and the contact output circuits 17 and 18 of the programmable controller 1.

According to this embodiment of this invention, the instructions describing the operations of the robot are defined, within the program of the programmable controller 1, as robot defining blocks for inputting to the robot controller 2 the operations of the robot and for receiving the output of the robot controller 2 indicating the states of the robot. The program containing the robot defining blocks which describe the operations of the robot is inputted via the input device 11, and stored in the memory 12. In the execution of the program, the program that has been read out from the memory 12 is scanned by the discrimination means 13 and the robot defining blocks are discriminated and extracted therefrom. In response to the output of the discrimination circuit 13, the information generation circuit 14 generates the robot operation information. This information is transmitted (inputted) to the robot controller via the first communication means 16a. The information with respect to the operational states of the robot, on the other hand, is transmitted (outputted) from the communication means 21 of the robot controller 2 to the second communication means 16b of the programmable controller 1. At the same time, the portions of the program which are discriminated by the discrimination means 13 to lie outside of the robot defining blocks, i.e., the non-robot-defining portions, are executed by the instruction processing circuit 15, such that the contacts and relays of the factory cell 3 are set and reset accordingly.

FIG. 5 shows examples of the robot defining blocks according to this invention. The operations of the robot are defined by means of the name or label "MOV", which represents an operation of the arm of the robot. The example of the MOV block 100 shown at FIG. 5(a) comprises: a label "MOV" 102 for representing the name of the block; START terminal 103 for inputting the start signal contact 110; POS1 terminal 104 for inputting the movement target value P1 111, which is defined beforehand by means of a separate means; and an END terminal 105 for outputting the movement completion signal to the relay contact Y1, 112, etc. Further FIG. 5(b) shows an example in which the movement target value P1 is given in a variable register 120. Furthermore, FIG. 5(c) shows an example in which the movement target value is given by the operational register 121 for obtaining the vector sum of the two variables P1 and P2, such that relative movements are commanded.

Figure 7:
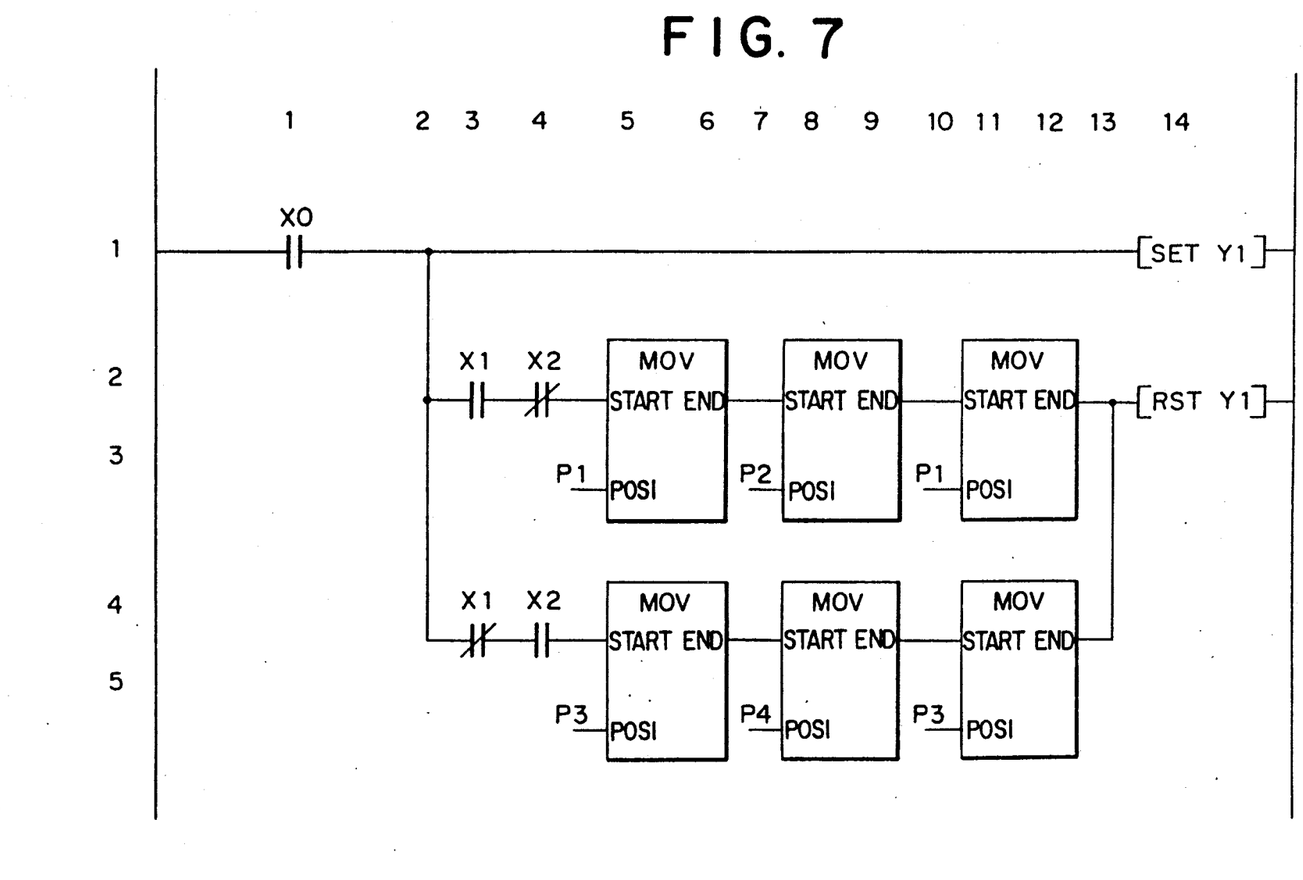
FIG. 7 shows an examplary program of the programmable controller of FIG. 4, which program corresponds to the operations shown in FIG. 6.

Next, the programming and the operation of the factory cell according to this embodiment of the invention is described. FIG. 6 is a flowchart showing a typical operational sequence of the factory cell. FIG. 7 is a program inputted to the programmable controller 1 for executing the operational sequence shown in FIG. 6. The numbers 1 through 14 at the top of FIG. 7 represent the column numbers, while the numbers 1 through 5 at the left represent the line numbers of the program. The program of FIG. 7 specifies the operations as follows.

The input contact X0 at line 1, column 1, corresponds to step 41 of FIG. 6 where the reception of the object (work) is waited and confirmed. When the contact X0 is closed, the output contact Y1 at line 1, column 14 is set to be turned on, such that the object fixing cylinder is started to fix the object (step 42 in FIG. 6).

The program then branches at line 1, column 2. At line 2, columns 3 and 4, and at line 4, columns 3 and 4, the kind of the object is discriminated by means of the state of the input contacts X1 and X2, and the operation of the robot is selected in accordance therewith (step 44 in FIG. 6).

First, let us assume that the contact X1 is ON and the operations at the second line (line 2) are selected. Then, the START terminal in the robot defining block at line 2, column 5 is turned on, such that a unitary movement instruction to the movement target point P1 shown at line 3, column 4 is generated by the robot operation state information generation circuit 14. The movement instruction thus generated by the circuit 14 is transmitted via the first communication means 16a to the robot controller 2. As a result, the arm operation control circuit 22 controls and starts, via the arm driving circuit 23, the robot arm 31 to move to the target point P1. When this movement of the robot arm is completed, the completion signal is transmitted from the arm operation control circuit 22 to the information generation circuit 14 via the communication means 21 and the second communication means 16b, and the END terminal at line 2, column 6 is turned on. The signal from this terminal END is connected to the START terminal of the second robot defining block at line 2, column 8. Thus, this second robot defining block is started in a manner similar to the above, and the robot moves to the movement target point P2 shown at line 3, column 7. When the robot arm reaches the target point P2, the END terminal at line 2, column 9 is turned on, in a manner similar to the above, thereby starting the third robot defining block. When the movement of the robot arm of the third robot defining block is completed, the END terminal thereof at line 2, column 12 is turned on (step 45 in FIG. 6), such that the output contact Y1 at line 2, column 14 is reset. As a result, the object fixing device 32 is turned off, and the object is released (step 46 in FIG. 6).

When, on the other hand, the contact X2 is ON, the operational sequence of the robot defining blocks at line 4 is selected at line 4, columns 3 and 4. Then, the execution proceeds through the three robot defining blocks shown thereat in FIG. 7, in a manner similar to the above, and thereafter resets the output contact Y1 to terminate the series of operations.

The programmable controller according to this embodiment of the invention greatly simplifies the programming. Namely, in the case of the conventional programmable controller, the starting operation of the robot (at step 43 in FIG. 6) are described in 19 lines (lines 4 through 22 in FIG. 2) in a ladder language. However, in the case of the programmable controller of this embodiment, it suffices only to connect the START terminal of the robot defining block to the input contacts (e.g., contacts X1 and X2 in FIG. 7) defining the starting condition. Further, with regard to the selection of the operation patterns of the robot arm according to the kind of the discriminated object, the conventional device requires 13 program description elements in the ladder language and 5 lines written in the robot language. However, in the device according to the embodiment, the description can be made only with the branching elements of the ladder language. Furthermore, the detection of the completion of the operation of the robot can be described in a simple and straightforward manner. Furthermore, since the hand-shake operations of the communication are effected automatically by the communication means 16a, 16b, and 21, the description of the program is further simplified. In addition, since the reciprocal communications between the communication means are effected separately from the scanning of the program, the execution speed of the whole program is enhanced. This improves the operation speed of the factory cell as a whole. In summary, the programmable controller according to this invention is improved in the simplicity of programming and maintenance of the program, as well as in the execution speed thereof.

While description has been made of the particular embodiment of this invention, it will be understood that many modifications may be made without departing form the spirit thereof. The appended claims are contemplated to cover any such modifications as fall within the true spirit and scope of this invention.

What is claimed is:

1. A programmable controller for a factory cell including a robot having a robot controller controlling the movements of the robot, said programmable controller comprising:
   program input means via which a program describing a series of operations of said robot is inputted, wherein the program comprises: robot operation defining instructions defining operations of the robot, and instructions other than the robot operation defining instructions;
   memory means, connected to said program input means, for storing the program inputted via the program input means;
   discrimination means, coupled to said memory means, for discriminating the robot operation defining instructions from the other instructions of the program stored and read out from the memory means;
   information generation means, coupled to the discrimination means, for generating robot operation information in accordance with the robot operation defining instructions discriminated by said discrimination means;
   first communication means, coupled to said information generation means, for transmitting to said robot controller of the robot the robot operation information generated by the information generation means;
   second communication means, coupled to the robot controller, for receiving information relative to a state of the robot operation from the robot controller; and
   instruction execution means, coupled to said discrimination means and said second communication means, for executing the instructions other than the robot operation defining instructions in parallel with the operation state information transmitted from the robot controller via the second communication means.

2. A programmable controller as claimed in claim 1, wherein said factory cell comprises a plurality of contacts and relays, and said instructions other than the robot operation defining instructions define states of the contacts and relays of the factory cell with respect to each other.

3. A programmable controller as claimed in claim 1, wherein said robot operation defining instructions comprise instruction blocks stored in said memory means, each instruction block describing a unitary movement of the robot.

* * * * *